US010733428B2

(12) United States Patent
Lawson et al.

(10) Patent No.: US 10,733,428 B2
(45) Date of Patent: Aug. 4, 2020

(54) RECOGNITION ACTIONS ON EVENT BASED CAMERAS WITH MOTION EVENT FEATURES

(71) Applicant: The Government of the United States of America, as represented by the Secretary of the Navy, Arlington, VA (US)

(72) Inventors: Wallace Lawson, Manassas, VA (US); Keith Sullivan, Alexandria, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 94 days.

(21) Appl. No.: 15/886,393

(22) Filed: Feb. 1, 2018

(65) Prior Publication Data

US 2018/0218203 A1    Aug. 2, 2018

Related U.S. Application Data

(60) Provisional application No. 62/453,131, filed on Feb. 1, 2017.

(51) Int. Cl.
*G06K 9/00* (2006.01)
*G06T 7/00* (2017.01)
*G06T 7/20* (2017.01)

(52) U.S. Cl.
CPC ............ *G06K 9/00348* (2013.01); *G06T 7/20* (2013.01); *G06T 2207/20081* (2013.01); *G06T 2207/20084* (2013.01)

(58) Field of Classification Search
CPC .................................... G06K 9/00; G06T 7/00
USPC ......................................................... 382/107
See application file for complete search history.

(56) References Cited

U.S. PATENT DOCUMENTS 4,700,400 A * 10/1987 Ross ..................... G06K 9/4647
382/205
9,836,484 B1 * 12/2017 Bialynicka-Birula ........................
G06F 16/51

\* cited by examiner

*Primary Examiner* — Abolfazl Tabatabai
(74) *Attorney, Agent, or Firm* — US Naval Research Laboratory; Richard Bis

(57) ABSTRACT

A method for recognizing an action captured on an event-based camera includes the steps of receiving asynchronously transmitted pixel locations which have changed intensity via an address-event bus; stacking a plurality of frames of received pixel location to form a surrogate RGB image where the channels represent individual frames; inputting the surrogate RGB image into a first convolutional neural network; and extracting feature $f_1$ from a last fully connected layer of the convolutional neural network to obtain an action classification of the action, thereby recognizing the action.

18 Claims, 1 Drawing Sheet

RECOGNITION ACTIONS ON EVENT BASED CAMERAS WITH MOTION EVENT FEATURES

RELATED APPLICATIONS

This application claims the benefit of U.S. Provisional Application No. 62/453,131 filed Feb. 1, 2017, which is hereby incorporated herein by reference.

FIELD OF INVENTION

The present invention relates generally to action recognition, and more particularly to recognizing actions on event based cameras.

BACKGROUND

An event camera or event-based camera is a sensor which outputs a stream of asynchronous spikes, each with pixel location, sign and precise timing, indicating when individual pixels record a threshold log intensity change, rather than not a sequence of video frames like a standard camera.

Deep neural structures have been successful in tasks such as recognition and segmentation in image databases. Specifically, convolutional neural networks (CNNs) are one architecture which has shown promise across a wide set of problems (in static images and videos), including action/activity recognition.

SUMMARY OF INVENTION

The purpose of this invention is to provide an efficient, biologically inspired method to recognize human actions, in particular, recognizing the general action that is being performed, such as "walking", "running", "kicking", etc. It is noted that this action recognition is different from activity recognition (i.e., play soccer), which is composed of many different actions.

Existing work on action recognition has produced good accuracy, but this is typically at the expense of the computational time, and typically with a strong dependency on a computationally expensive, noisy measurement of motion called 'optical flow'. The goal of the present invention is to address computational speed and robustness of optical flow simultaneously, using an event-based camera, which only measures the locations of the images that have changed, and does so in a manner that is typically more robust to issues such as lighting that affect optical flow.

The present invention results in an efficient way of recognizing actions using an approach that is tolerant to a wide variety of lighting conditions. The invention has the potential to be of interest in several different fields. With the appropriate hardware, such an approach could be placed on a surveillance camera to perform real-time action recognition in any area of interest. This can easily be added to a mobile robotics platform to provide a way of understanding an interacting with a collaborator. This could also be generally be used as a way of human-computer interaction, using the action of a person as the interface.

According to one aspect of the invention, a method for recognizing an action captured on an event-based camera, includes the steps of: receiving asynchronously transmitted pixel locations which have changed intensity via an address-event bus; stacking a plurality of frames of received pixel location to form a surrogate RGB image where the channels represent individual frames; inputting the surrogate RGB image into a first convolutional neural network; and extracting feature $f_1$ from a last fully connected layer of the convolutional neural network to obtain an action classification of the action, thereby recognizing the action.

Optionally, the method includes the steps of recording the action with an event-based camera; measuring optical intensity at a plurality of pixels of the event-based camera; and asynchronously transmitting the pixel locations which have changed intensity via the address-event bus.

Optionally, the method includes the steps of constructing eight-bit grey-scale images from an event-stream of the event-based camera, wherein each pixel starts with a value that is either increased or decreased according to events that arrived during a time interval $\Delta t$ and the direction of the intensity change.

Optionally, the direction of motion of the action is captured by stacking 3 frames together with timestamps of $t-T/2$, $t$, $t+T/2$ to cover a time interval T.

Optionally, the method includes computing motion event features using equation (3), described below.

Optionally, the method includes training a convolutional neural network to recognize actions using the MEF representation.

Optionally, the convolutional neural network includes 5 convolutional layers, 2 fully connected layers, and one softmax output layer.

Optionally, the method includes replacing a final softmax layer of a pre-trained convolutional neural network with a new softmax layer having a number of neurons equal to a number of actions to be recognized; and using training data, resume training to update network weights.

Optionally, the method includes centering observed motion contained in the training data to a middle of an image, thereby reducing overfitting while training.

Optionally, the method includes using a second convolutional neural network having a time-scale different from a time-scale of the first convolutional neural net.

Optionally, the method includes extracting features $f_1$, $f_2$ from a last fully connected layer from the first and second convolutional neural networks; and applying a linear support vector machine to a combined feature vector $f_3 = [f_1 f_2]$ to obtain an action classification of the action, thereby recognizing the action.

According to another aspect of the invention, a computer program product includes computer readable instructions configured to, when executed by a processor, cause the processor to execute one or more of the methods above.

According to another aspect of the invention, a method for recognizing an action captured on an event-based camera includes receiving asynchronously transmitted pixel locations which have changed intensity via an address-event bus; stacking a plurality of frames of received pixel location to form a surrogate RGB image where the channels represent individual frames; computing motion event features (MEF) from the surrogate RGB image using equation (3); and extracting feature $f_1$ from the motion event features to obtain an action classification of the action, thereby recognizing the action.

Optionally, the method includes recording the action with an event-based camera; measuring optical intensity at a plurality of pixels of the event-based camera; and asynchronously transmitting the pixel locations which have changed intensity via the address-event bus.

Optionally, the method includes constructing eight-bit grey-scale images from an event-stream of the event-based camera, wherein each pixel starts with a value that is either increased or decreased according to events that arrived during a time interval Δt and the direction of the intensity change.

Optionally, the direction of motion of the action is captured by stacking 3 frames together with timestamps of t−T/2, t, t+T/2 to cover a time interval T.

Optionally, the method includes training a convolutional neural network to recognize actions using the MEF representation.

Optionally, the convolutional neural network includes 5 convolutional layers, 2 fully connected layers, and one softmax output layer.

Optionally, the method includes using a second convolutional neural network having a time-scale different from a time-scale of the first convolutional neural net; extracting features $f_1$, $f_2$ from a last fully connected layer from the first and second convolutional neural networks; and applying a linear support vector machine to a combined feature vector $f_3=[f_1 f_2]$ to obtain an action classification of the action, thereby recognizing the action.

According to another aspect, a computer program product comprising computer readable instructions configured to, when executed by a processor, cause the processor to execute the methods above.

The foregoing and other features of the invention are hereinafter described in greater detail with reference to the accompanying drawings.

DETAILED DESCRIPTION

Figure 1:
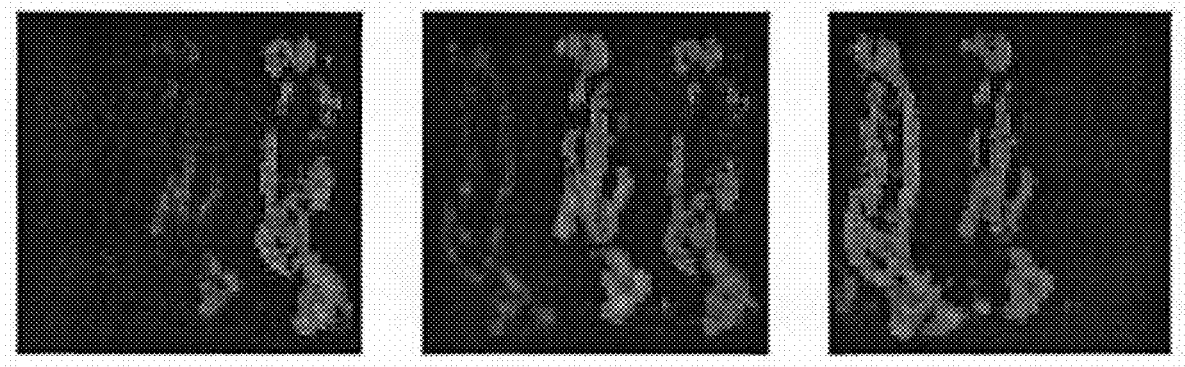
FIG. 1 shows example of stacking multiple frames together for a running action (from right to left) where a blue channel represents the most recent frame, green channel the next most recent, and red channel is the most ancient frame, for example.

Presented herein are exemplary methods for using a system (for example, an autonomous robot) to recognize human actions via a CNN. "Actions" as used herein are low-level movements such as run, walk, or wave, while "activities" as used herein are relatively higher-level movements that compose actions in a specific temporal sequence (e.g., play basketball, eat, brush hair).

Humans are thought to recognize motion as described by the two-stream hypothesis: the ventral stream performs object recognition based on static visual information, and, running complimentarily, the dorsal stream recognizes motion without necessarily considering visual appearance. Inspired by the neuroscience hypothesis, a two-stream deep neural network architecture for action recognition that performs well on two difficult action recognition databases has been developed that has demonstrated success in both action recognition and activity recognition. All these approaches rely on optical flow, which can be a computational bottleneck. Optical flow also has other known issues, such as the assumption that the lighting remains constant in the scene which can also impact the results.

To overcome issues such as these, the present invention uses an event-based camera rather than a traditional RGB camera. Similar to how the eye senses motion, event-based cameras asynchronously transmit pixel locations which have changed intensity via an address-event bus, rather than synchronously transmit the entire image. There is no concept of a traditional frame rate: the camera only transmits events when they occur (i.e., when the intensity of a pixel changes appreciably). Each pixel has wide dynamic range, low latency, and has a logarithmic response to lighting intensity changes. To wit, each pixel is sensitive to temporal contrast:

$$TCON = \frac{\partial(\ln(I(t)))}{\partial t} \quad (1)$$

where I is the photocurrent. An example event-based camera that may be used in exemplary embodiments of the invention includes the Dynamic Vision Sensor (DVS) from iniLabs with a resolution of 128×128.

With an event-based camera, the present invention proposes a slightly different interpretation of the two-stream hypothesis: motion processing should be done before appearance processing and fusion should occur later. In this way, action recognition can be performed quickly, which is important in domains such as autonomous robotics and surveillance.

One challenge with using CNNs with event-based cameras is determining an appropriate image representation. Exemplary methods may stack N frames to form a surrogate RGB image where the channels represent individual frames. To account for both fast and slow motions, two independent CNNs representing different temporal time-scales may be used. Rather than construct each network from scratch, existing architectures (such as, for example, the AlexNet architecture, known to those skilled in the art) may be fine-tuned (by, in the AlexNet case, replacing the final softmax output layer with a new softmax output layer with one neuron per recognized action). We extract the features $f_1$, $f_2$ from the last fully connected layer from both networks, then apply a linear support vector machine (SVM) to the combined feature vector $f_3=[f_1 f_2]$ to obtain the action classification.

The nature of the data from an event-based camera raises questions on the best image representation for CNNs. The representation should provide both the magnitude and direction of the motion, neither of which is inherently provided by event-based cameras. Conventional optical flow algorithms for event-based cameras are noisy and computationally expensive. In contrast, exemplary methods use deep features from CNNs to learn motion from a stacked representation of the images from the event-based camera.

We construct eight-bit grey-scale images from the eventstream off the DVS camera as follows: each pixel starts with a value of 128, and is either increased or decreased according to the number of events that arrived during a time interval Δt and the direction of the intensity change. Thus, the value at each pixel location (x, y) is $$p(x,y)=128+\|e(x,y) \in E_{pos}\|-\|e(x,y) \in E_{neg}\| \quad (2)$$

where $E_{pos}$ is the set of events where the intensity increased, $E_{neg}$ is the set of events where the intensity decreased, and $\|\cdot\|$ computes the size of the set. We threshold each pixel $0<=p(x, y)<=255$, and the time interval corresponds to a frame rate of 1/Δt.

The direction of the motion is captured by stacking 3 frames together with timestamps of t−T/2, t, t+T/2 to cover a time interval T. The choice of T is based on the speed of the expected action: a shorter interval is appropriate for fast actions such as running, while a longer interval is apropos for slower actions such as walking. Stacking the frames in this manner allows us to represent the direction of the motion. FIG. 1 shows three example frames from a running action (from right to left) taken at t−T/2, at t, and at t+T/2. In this case, T=0.33 seconds, too large for practical purposes, but used here for illustration.

To represent the magnitude of the motion, we compute Motion Event Features (MEFs). MEFs operate by capturing the events that occur in small spatial regions. The value of each region represents the amount of motion present in a manner that is similar to histogram of features. MEFs are a 3D array where two dimensions are proportional to the image dimensions and the third dimension varies according to how much information is required. While exemplary embodiments use CNNs to interpret MEFs, any computer vision algorithm requiring a 3D array input would be applicable. MEFs are based on the observation that the motion's magnitude is correlated to the number of reported events from the camera. Equation 3 shows how we summarize the magnitude of motion over small grid cells. For each grid cell R, we count the number of events that have occurred, and then normalize by a large constant K $$MEF(R) = \frac{\sum_{x,y \in R} e(x, y)}{K}. \qquad (3)$$

Figure 2:
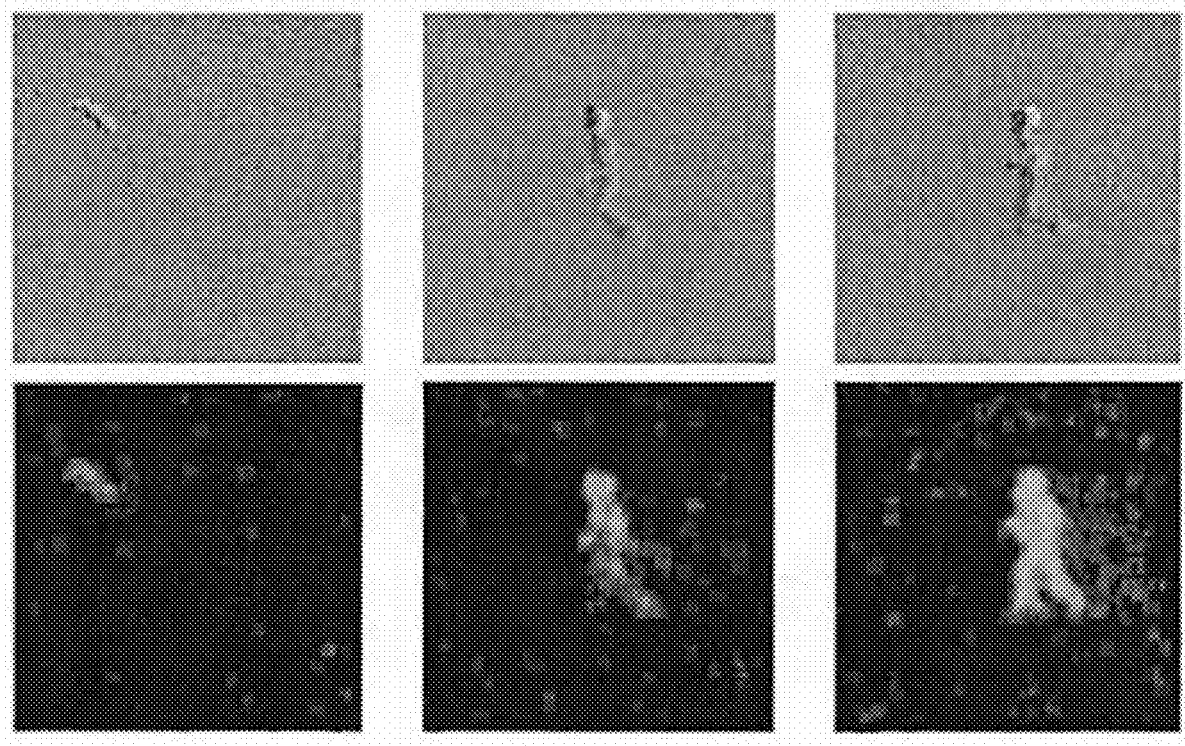
FIG. 2 shows a series of three action images, the top row showing raw event-based camera images, and the bottom row show the corresponding Motion Event Features (MEFs).

FIG. 2 shows several examples of how MEFs look compared to standard event-based images.

We train a CNN to recognize actions using the MEF representation with the AlexNet architecture: 5 convolutional layers, 2 fully connected layers, and one softmax output layer.

We fine-tune AlexNet by starting with a pre-trained network, and replacing the final softmax layer with a new softmax layer where the number of neurons is equal to the number of actions to be recognized. Then, using our data, we resume training to update the network weights, especially the weights of the new softmax layer. To reduce overfitting, we center the observed motion in the middle of the image.

A single CNN typically recognizes actions of approximately the same speed, thus, causing poor performance across datasets with different speed actions. To compensate for this, we train two CNNs with different temporal timescales: we set T such that the three frames in our surrogate RGB image are numbered either i, i+1, i+2 (1-frame offset) or i, i+5, i+10 (5-frame offset). We combine the two networks using feature-level fusion: a linear SVM is trained using the concatenated, extracted activations from the last fully connected layer. The output from the SVM is our final action classification.

Since there are no event-based action recognition datasets, an example method for validation includes having the event-based camera "watch" video sequences of standard RGB datasets to generate an event-based version, which will miss high-frequency temporal information. One could also collect a dataset in a laboratory using the event-based camera directly.

Exemplary approaches have been run at approximately 26 FPS with the bulk of the computation time processing the CNNs. Thus, exemplary approaches are applicable to near-real time scenarios such as autonomous robotics and surveillance.

In situations of confusion due to similar actions (for example, horseback and walk may be confused confused because the network sees locomotion but it does not understand the source of the locomotion; likewise walk and golf-swing may be confused due to the nature of the golfer standing relatively still during a large part of the sequence), confusions could be eliminated by including information from the ventral stream (i.e., RGB information). Similarly, it has been found that there may be a clear delineation between actions performed by the upper body (boxing, waving, clapping) and the lower body (walking, running, jogging) since the combined CNN never confuses an upper body action for a lower body action and vise-versa. The low performance on walking (and the associated confusion with jogging) is due to the small temporal separation of the two actions. It is possible that selecting a bigger offset (e.g., time interval T) would alleviate this problem.

Exemplary methods compare favorably to conventional approaches that use a combination of approaches (histogram of oriented gradient (HoG), Histogram of Optical Flow (HOF), and Motion Boundary Histogram (MBH)). It is noted that many conventional approaches understand a sequence of frames to perform action recognition, while exemplary embodiments recognize actions at individual frames. Additionally, unlike conventional approaches, exemplary methods are interested in and achieve real-time performance.

Another exemplary embodiment includes performing reactive control. Such exemplary methods may include training a CNN from scratch as follows. The CNN may include two convolution layers, two pooling layers, two fully connected layers, and a softmax output layer. The input shape may be N×64×64, where N is the number of frames in the MEF construction. The convolutional layers may use 16 filters of size 2×2 and each pooling layer may use a 2×2 filter with a stride of one. The fully connected layers may have 10 neurons each. The softmax output may have three outputs: turn left, turn right, and go forward. The outputs may correspond to fixed velocity motions of the robot; to minimize the size of the output space, we did not consider variable turn rates nor variable translational velocities. The CNN may be trained using sample images or ones recorded by the robot itself. In an exemplary embodiment, using these training images, the network may be trained from scratch using Adam stochastic optimization. During testing, the robot may be fully autonomous.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for recognizing an action captured on an event-based camera, the method comprising the steps of:

receiving asynchronously transmitted pixel locations which have changed intensity via an address-event bus;

stacking a plurality of frames of received pixel location to form a surrogate RGB image where the channels represent individual frames;

inputting the surrogate RGB image into a first convolutional neural network;

extracting feature $f_1$ from a last fully connected layer of the convolutional neural network to obtain an action classification of the action, thereby recognizing the action;

recording the action with an event-based camera;

measuring optical intensity at a plurality of pixels of the event-based camera; and asynchronously transmitting the pixel locations which have changed intensity via the address-event bus.

2. The method of claim 1, further comprising the steps of:

constructing eight-bit grey-scale images from an event-stream of the event-based camera, wherein each pixel starts with a value that is either increased or decreased according to events that arrived during a time interval Δt and the direction of the intensity change.

3. The method of claim 2, wherein direction of motion of the action is captured by stacking 3 frames together with timestamps of t−T/2, t, t+T/2 to cover a time interval T.

4. The method of claim 2, further comprising the step of:

computing motion event features (MEF) using equation (3).

5. The method of claim 4, further comprising the step of:

training a convolutional neural network to recognize actions using the MEF representation.

6. The method of claim 1, wherein the convolutional neural network includes 5 convolutional layers, 2 fully connected layers, and one softmax output layer.

7. A computer program product comprising computer readable instructions configured to, when executed by a processor, cause the processor to execute the method of claim 1.

8. A method for recognizing an action captured on an event-based camera, the method comprising the steps of:

receiving asynchronously transmitted pixel locations which have changed intensity via an address-event bus;

stacking a plurality of frames of received pixel location to form a surrogate RGB image where the channels represent individual frames;

inputting the surrogate RGB image into a first convolutional neural network;

extracting feature $f_1$ from a last fully connected layer of the convolutional neural network to obtain an action classification of the action, thereby recognizing the action;

replacing a final softmax layer of a pre-trained convolutional neural network with a new softmax layer having a number of neurons equal to a number of actions to be recognized; and using training data, resume training to update network weights.

9. The method of claim 8, further comprising the step of:

centering observed motion contained in the training data to a middle of an image, thereby reducing overfitting while training.

10. A method for recognizing an action captured on an event-based camera, she method comprising the steps of:

receiving asynchronously transmitted pixel locations which have changed intensity via an address-event bus;

stacking a plurality of frames of received pixel location to form a surrogate RGB image where the channels represent individual frames;

inputting the surrogate RGB image into a first convolutional neural network;

extracting feature $f_1$ from a last fully connected layer of the convolutional neural network to obtain an action classification of the action, thereby recognizing the action; and using a second convolutional neural network having a time-scale different from a time-scale of the first convolutional neural net.

11. The method of claim 10, further comprising the steps of:

extracting features $f_1$, $f_2$ from a last fully connected layer from the first and second convolutional neural networks, respectively; and applying a linear support vector machine to a combined feature vector $f_3=[f_1 f_2]$ to obtain an action classification of the action, thereby recognizing the action.

12. A method for recognizing an action captured on an event-based camera, the method comprising the steps of:

receiving asynchronously transmitted pixel locations which have changed intensity via an address-event bus;

stacking a plurality of frames of received pixel location to form a surrogate RGB image where the channels represent individual frames;

computing motion event features (MEF) from the surrogate RGB image using equation (3);

extracting feature $f_1$ from the motion event features to obtain an action classification of the action, thereby recognizing the action;

recording the action with an event-based camera;

measuring optical intensity at a plurality of pixels of the event-based camera; and asynchronously transmitting the pixel locations which have changed intensity via the address-event bus.

13. The method of claim 12, further comprising the steps of:

constructing eight-bit grey-scale images from an event-stream of the event-based camera, wherein each pixel starts with a value that is either increased or decreased according to events that arrived during a time interval Δt and the direction of the intensity change.

14. The method of claim 13, wherein direction of motion of the action is captured by stacking 3 frames together with timestamps of t−T/2, t, t+T/2 to cover a time interval T.

15. A computer program product comprising computer readable instructions configured to, when executed by a processor, cause the processor to execute the method of claim 12.

16. A method for recognizing an action captured on an event-based camera, the method comprising the steps of:

receiving asynchronously transmitted pixel locations which have changed intensity via an address-event bus;

stacking a plurality of frames of received pixel location to form a surrogate RGB image where the channels represent individual frames;

computing motion event features (MEF) from the surrogate RGB image using equation (3);

extracting feature $f_1$ from the motion event features to obtain an action classification of the action, thereby recognizing the action; and training a convolutional neural network to recognize actions using the MEF representation.

17. The method of claim 16, wherein the convolutional neural network includes 5 convolutional layers, 2 fully connected layers, and one softmax output layer.

18. A method for recognizing an action captured on an event-based camera, the method comprising the steps of:
- receiving asynchronously transmitted pixel locations which have changed intensity via an address-event bus;
- stacking a plurality of frames of received pixel location to form a surrogate RGB Image where the channels represent individual frames;
- computing motion event features (MEF) from the surrogate RGB image using equation (3);
- extracting feature $f_1$ from the motion event features to obtain an action classification of the action, thereby recognizing the action;
- using first and second convolutional neural networks having different time-scales;
- extracting features $f_1$, $f_2$ from a last fully connected layer from the respective first and second convolutional neural networks; and
- applying a linear support vector machine to a combined feature vector $f_3=[f_1 f_2]$ to obtain an action classification of the action, thereby recognizing the action.

* * * * *